United States Patent [19]

Kopernak

[11] 3,822,035

[45] July 2, 1974

[54] SOLDERING AND DESOLDERING SYSTEM

[75] Inventor: Rudy L. Kopernak, Indianapolis, Ind.

[73] Assignee: Enterprise Development Corporation, Indianapolis, Ind.

[22] Filed: Feb. 14, 1972

[21] Appl. No.: 225,960

[52] U.S. Cl..................... 228/20, 15/345, 219/229
[51] Int. Cl............................................. B23k 1/00
[58] Field of Search.......... 228/19, 20, 21; 219/229, 219/230, 231; 15/344, 345; 417/472

[56] References Cited
UNITED STATES PATENTS

| 3,045,095 | 7/1962 | Usher et al. | 228/20 X |
| 3,259,293 | 7/1966 | Deyzani | 228/20 |
| 3,422,247 | 1/1969 | Royston et al. | 228/20 X |
| 3,443,733 | 5/1969 | Parente | 228/20 |
| 3,578,948 | 5/1971 | Friend et al. | 228/20 X |

Primary Examiner—J. Spencer Overholser
Assistant Examiner—Robert J. Craig
Attorney, Agent, or Firm—Woodard, Weikart, Emhardt & Naughton

[57] ABSTRACT

This is a system for continuous soldering and desoldering. A soldering iron is provided with a hollow tip which is connected by a tube to a bellows pump. An electric motor has an output drive shaft fixedly connected to a crank. One end of the crank is rotatably connected to a rod secured to the movable end of the bellows. The bellows is expanded and contracted by rotating the output drive shaft. The opposite end of the crank has a cam fixedly mounted thereon which is engageable with actuator arms of a pair of electrical switches mounted on opposite sides of the output drive shaft. A switch mounted on the iron is operable to connect a source of electrical energy to the motor, thereby expanding the bellows pump and withdrawing material from a soldered joint or connection, through the tip. Another switch on a receptacle is operable to cause contraction of the bellows causing the withdrawn material to be expelled or ejected into the receptacle. A third switch and a pressure release flap valve are operable to establish a continuous vacuum at the tip, with every expanding cycle of the bellows, if desired, to enable withdrawal of material through the tip and avoid necessitating ejection of material therethrough.

24 Claims, 6 Drawing Figures

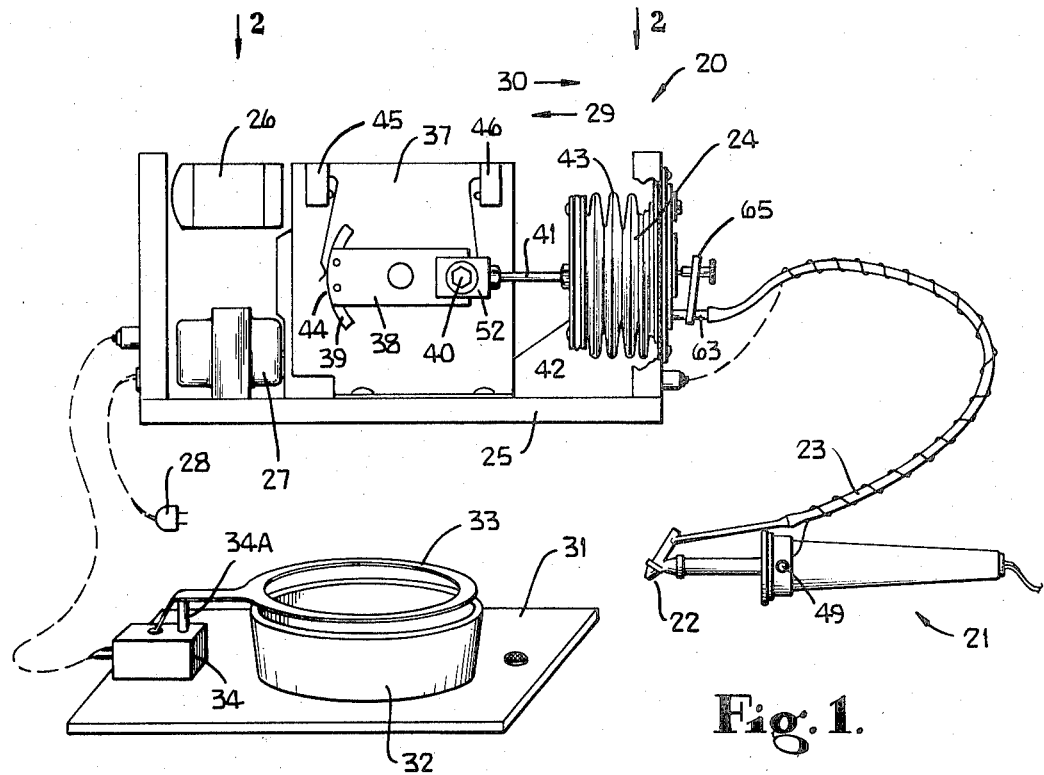
Fig. 1.
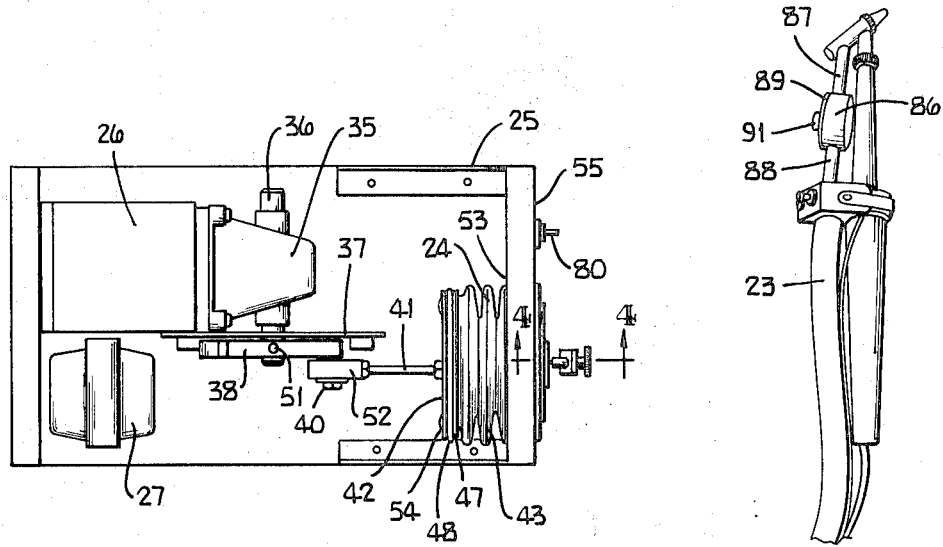
Fig. 2.
Fig. 6.

SOLDERING AND DESOLDERING SYSTEM

BACKGROUND OF THE INVENTION

1. Field of the Invention

This invention is in the field of soldering systems and, more specifically, soldering systems having a desoldering capability.

2. Description of the Prior Art

When repairing a device having a soldered joint, it is desirable to withdraw the old solder from the joint prior to resoldering the joint, to facilitate component removal and/or repair. A tool originated by me and now known in the art for desoldering a joint, has a flexible bulb connected by a hollow stem to the hollow tip of a soldering iron. By squeezing the bulb and then heating the joint with the soldering iron, the various materials present at the joint may be withdrawn through the tip upon release of the squeezed bulb. The operator must squeeze the bulb over some kind of waste receptacle, then heat the soldered joint, and then release the bulb. The Endeco Model 300 desoldering iron manufactured and sold by Enterprise Development Corporation of 5127 East 65th Street, Indianapolis, Ind. 46220 is an example of this rubber bulb "expulsion type desoldering iron".

"Collector or collection type desoldering irons" have been devised. The Endeco Model 100A desoldering iron is a good example and employs a rubber vacuum bulb and a stainless steel collection tube. This type device is described in my early U.S. Pat. No. 3,245,597 issued Apr. 12, 1966. Some continuous vacuum type desoldering systems typically have an electric pump for providing in the hollow tip a pressure lower than the ambient pressure and avoid the necessity to squeeze and release the bulb. Various desoldering apparatus is described in patents listed in my aforementioned patent and in my U.S. Pat. Nos. 3,245,598 and 3,279,674, issued Apr. 12, 1966 and Oct. 18, 1966, respectively.

Most known desoldering systems suffer frequent malfunctioning from the effects of various contaminants, both gaseous and solid, necessarily inhaled into the system when the melted solder is withdrawn into the device. These contaminants or waste by-products largely consist of burnt fluxes, metals and certain protective coatings found on printed circuits. Damage to the systems due to these contaminants is probably the most significant problem in prior art desoldering systems. Previously, desoldering equipment designers have attempted to minimize the damage of these pollutants to valves and vacuum pumps through the use of filters. The filters require frequent cleaning or replacement whereas the valves and vacuum pumps soon become contaminated and, as a result, malfunction.

Disclosed herein is a new soldering and desoldering system which does not utilize filters. It has a bellows pump and a pressure release valve made from flexible material thereby preventing jamming and resulting malfunction of the pump and valve by the contaminating materials. It is operable in two modes, namely: 1. Ejection mode, and 2. Collection mode (usually with a continuous vacuum).

SUMMARY OF THE INVENTION

In one embodiment of the present invention there is provided a system for working with materials rendered liquid by application of heat, the system including a heated tip having a passageway therein for passage of liquified material therethrough, handle means supporting the tip, switch means, and pumping means (preferably employing a rubber bellows) coupled to the passageway and to the switch means and responsive to operation of the switch means to cause movement of fluid in the passageway in one direction, and responsive to operation of the switch means to cause movement of fluid in the passageway in the opposite direction. The method of desoldering with this embodiment comprises the steps of heating a soldered joint with a soldering iron, actuating first switch means to cause heated solder from the joint to be sucked from the joint into the soldering tip, and activating second switch means associated with a suitable waste product receptacle to force the heated solder out of the tip into the receptacle.

Another embodiment of the invention employs a collector with the soldering iron, and the pump runs continuously. A large very flexible one-way valve, comparatively immune to pollutants associated with desoldering operations, is employed.

It is an object of the present invention to provide a new and improved soldering and desoldering system.

It is a further object of the present invention to provide a desoldering system comparatively immune to malfunction as a result of contamination of valves and pumping means within the system.

Yet another object of the present invention is to provide a desoldering system enabling a controlled duration of vacuum application to the joint being desoldered.

Related objects and advantages of the present invention will be apparent from the following description.

BRIEF DESCRIPTION OF THE DRAWING

FIG. 1 is a side view of the system incorporating the present invention with portions fragmented and, a portion being illustrated in perspective.

FIG. 2 is a top view looking in the direction of arrows 2—2 of FIG. 1 of the pump and motor assembly 20.

FIG. 6 is a perspective view of a desoldering iron which may be employed in the collection type embodiment of the invention.

DESCRIPTION OF THE PREFERRED EMBODIMENT

Figure 3:
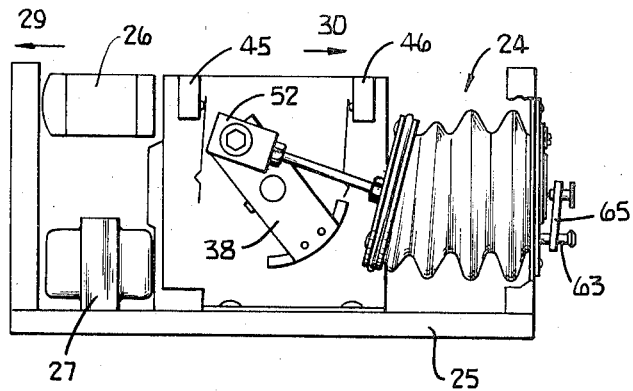
FIG. 3 is a side view of the assembly 20 shown in FIG. 1 with the bellows pump 24 shown in the partially expanded position.

Referring now more particularly to FIG. 1, there is shown a soldering and desoldering system incorporating the present invention having a pump and motor assembly 20, a soldering iron 21 and a receptacle 32 for receiving the fluid and other materials withdrawn from the joint being desoldered. Fixedly mounted to the frame 25 of assembly 20 is a motor 26 and transformer 27. A conventional power plug 28 for receiving electrical energy from a wall socket is electrically connected to the transformer and motor. The outer housing of assembly 20 has not been shown in the drawings for the sake of clarity; however, the housing completely encloses the assembly being secured to frame 25 by conventional fastening means. The output drive shaft 36 (FIG. 2) is rotated in a fixed direction by motor 26 through gearbox 35. Drive shaft 36 extends freely through plate 37 (FIG. 1) which extends upwardly from, and is fixedly mounted to, frame 25. A crank 38 is fixedly mounted on one end of shaft 36 adjacent to but spaced from plate 37. A fastener 51, such as a screw, is threadedly received into crank 38 contacting shaft 36 and preventing relative motion between the crank and shaft. A cam 39 having surface 44 is fixedly connected to one end of the crank whereas a block 52 is rotatably connected to the other end of the crank by fastener 40. A rod 41 is threadedly received by block 52 having its opposite end fixedly connected to plate 42 of bellows pump 24. Pump 24 has a flexible accordian element 43 having one end 48 secured to and between plates 42 and 47 (FIG. 2). It is believed preferable that the accordian element have an inner surface of an elastomeric material (synthetic rubber, for example) which has a smooth finish. Thus it will be resilient and relatively immune to any pollutants developed in the desoldering operation. Standard fastening devices 54 threadedly extend through plates 42 and 47 and end 48 of element 43 securing the plates and element together. The opposite end 53 of element 43 is mounted to vertical end wall 55 of frame 25.

Figure 4:
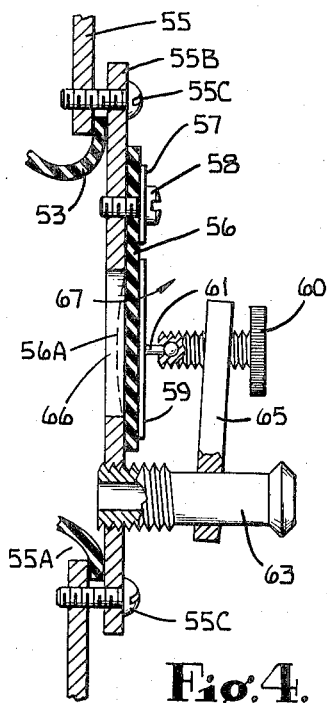
FIG. 4 is an enlarged section through the frame end wall, bellows end, cover plate, and with valve shown in FIG. 1, the section being taken at line 4—4 in FIG. 2 and viewed in the direction of the arrows.

As shown in FIG. 4, the bellows end 53 extends through a circular opening 55A in end wall 55, and is sandwiched between the outer face of the end wall and the bellows end cover plate 55B secured to the end wall by four circularly spaced screws 55C. The end of the bellows is thereby sealed to cover plate 55B.

A hollow stem 63, threadedly mounted to end wall 55, allows communication between the hollow interior of bellows pump 24 and hose 23 mounted to and between stem 63 and soldering iron 21 (FIG. 1). The hose should have a smooth elastomeric inner surface. The soldering iron has a hollow tip 22 which is electrically heated, being mounted to a conventional handle. The hollow tip communicates through a passageway associated therewith to the opposite end of hose 23 connected to stem 63. Thus, as shaft 36 is rotated to expand the bellows pump in the direction of arrow 29 in FIG. 1, a vacuum or a pressure lower than the ambient pressure is applied through hose 23 to hollow tip 22, thereby withdrawing fluids and other materials from the joint being desoldered.

To permit a continuous vacuum mode of operation, a flexible flap valve 56 (FIG. 4) is provided, and has a top end mounted to cover plate 55B by screw 58, with a washer 57 positioned between the flap valve and screwhead. A hole 66 in the cover plate 55B is covered by a rubber flap valve 56 when the valve lies adjacent end wall 55. A pressure plate 59 engaging the outer surface of flap valve 56, has a stem 61 thereon pivotally retained in the end of a thumbscrew 60 threadedly received in an apertured bracket 65 slidingly received on stem 63. Hole 66 is normally sealingly closed by threading screw 60 inwardly, which cocks the bracket 65 on stem 63 so it won't slide further outward thereon. Further turning of the screw clamps the plate 59 against the valve 56, sealing hole 66. Thus, when the bellows pump rod 41 moves in the direction of arrow 30 to collapse the bellows pump, the fluid and other material previously withdrawn into the hollow stem during the expansion of the bellows pump will be forced outwardly from the hollow tip 22. This is the expulsion mode. On the other hand, for the continuous vacuum mode, thumb screw 60 is threaded outward to allow bracket 65 to swing around stem 63 and downward, whereby plate 59 is removed from flap valve 56. Then contraction of the bellows pump will result in flap valve 56 pivoting outwardly in the direction of arrow 67, allowing the gases within the bellows pump to escape through opening 66 in lieu of through stem 63, because opening 66 is considerably larger than the passage extending through stem 63, allowing the gases to take the path of least resistance through opening 66. Depending upon the inside diameter of the desoldering tip 22, opening 66 at ¾ inch diameter would be 61 to 459 times greater in area.

Fixedly mounted to plate 31 (FIG. 1) is a receptacle 32 with a miniature electrical switch 34 also being mounted atop the plate adjacent the receptacle. A ring 33 is pivotally mounted to switch 34 and is in spaced relationship to the top rim of receptacle 32. The actuating rod 34A of switch 34 is depressed when soldering iron 21 is rested atop ring 33 so as to force the ring towards receptacle 32. When flap valve 56 is locked in the closed position, actuation of switch 34 causes the bellows pump to contract, thereby forcing the materials previously withdrawn from the desoldered joint, out through the hollow tip of the soldering iron and into the receptacle 32.

Figure 5:
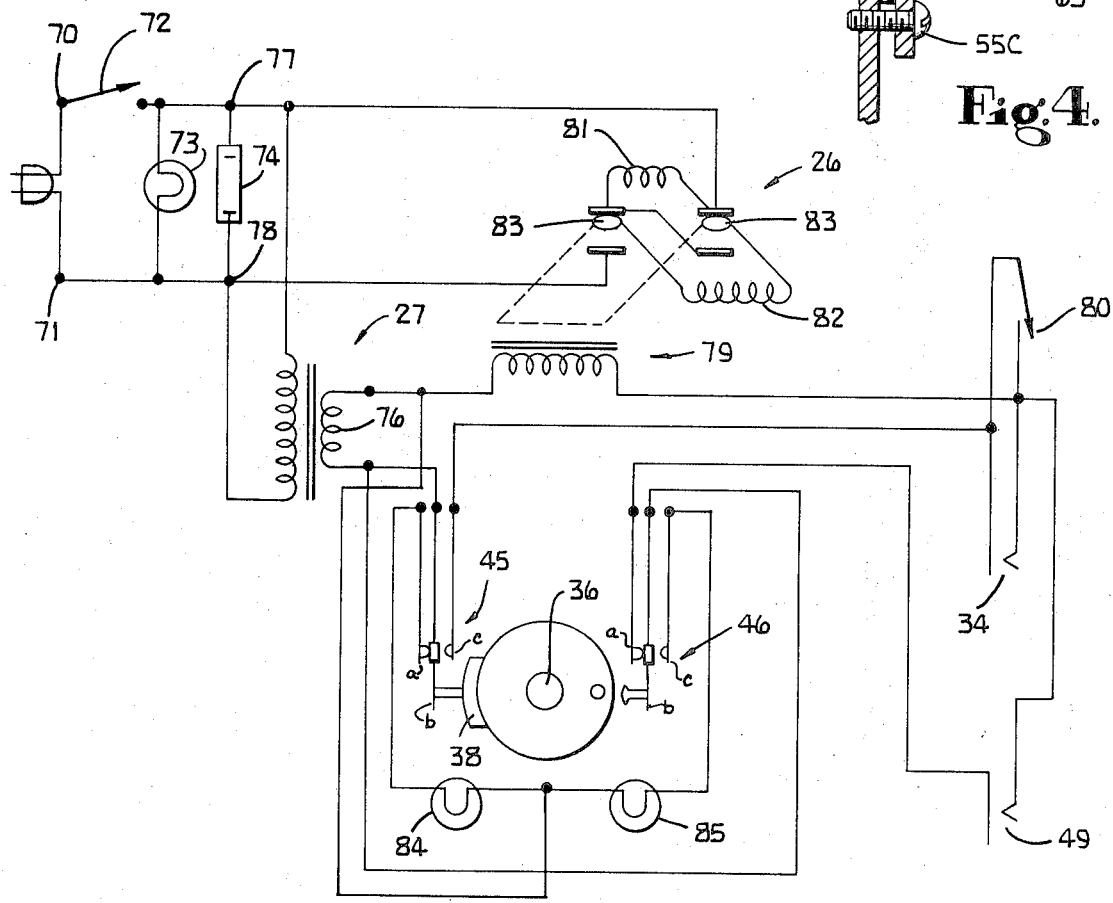
FIG. 5 is a schematic representation of an electrical circuit for the system of FIG. 1.

FIG. 5 is a schematic representation of the electrical circuitry of the soldering and desoldering system. Input terminals 70 and 71 are connected to a source of electrical energy. The input terminals are shown in FIG. 1 as the prongs of the input power plug 28. A power switch 72 may be closed or open to actuate or deactuate the system, with a lamp 73 being connected across the input terminals to indicate whether the system is connected to he source of electrical energy. The input terminals 77 and 78 of motor 26 are connected to the alternating current source of electrical energy received by terminals 70 and 71. A convenience outlet 74 is connected across the motor input terminals. The primary winding of transformer 27 is also connected across input power terminals 70 and 71, with the secondary 76 of transformer 27 being connected through various switches and across the coil of relay 79. Contacts 83 of relay 79 are shown contacting the contacts of armature 81 but not those of field coil 82, thereby preventing activation of motor 26. When relay coil 79 is energized, contacts 83 close on the field coil contacts thereby allowing current to flow through armature 81 of motor 26 and field coil 82 of motor 26 resulting in the rotation of shaft 36 and cam 38. A pair of electrical switches 45 and 46 are mounted to plate 37 (FIG. 1), each having an actuator arm movable by cam 38.

The soldering iron of FIG. 6 has a collector 86 between the tube 87 associated with the aperture tip and the tube 88 to which the flexible tube or hose 23 is attached. The collector receives solder, rosin, and any other residue and contaminants sucked from joints during desoldering. Lid 89 retained by screw 91 is readily removable whenever desirable to empty the collector.

OPERATION a. Ejection or Expulsion Mode

To operate the soldering-desoldering system in the expulsion or ejection mode, flap valve 56 is secured in closed condition. Power switch 72 is closed and the tip of the soldering iron is allowed to heat to operating temperature. The operator then places the tip over the joint to be desoldered. Switch 49 mounted to the handle of the soldering iron is actuated when the solder is melted, thereby connecting the source of electrical energy through contacts a and b of switch 46 (FIG. 5) to relay coil 79 initiating the rotation of shaft 36. As shaft 36 rotates, cam 38 disengages movable actuator arm b of switch 45 and engages movable actuator arm b of switch 46 thereby breaking the circuit between contacts a and b of switch 46 and interrupting the current flow to relay 79 allowing the automatic dynamic braking feature of the motor to stop the motor. Simultaneously, with the rotation of shaft 36, the bellows pump is caused to expand as shaft 36 rotates so as to position cam 39 adjacent switch 46. The speed should be such that the half revolution for the vacuum stroke occurs in 1 second or less.

To expel the materials withdrawn into the hollow tip of the soldering iron, the soldering iron is rested atop ring 33, thereby causing switch 34 to close, connecting the source of electrical energy through contacts b and c of switch 45 to the coil of relay 79. Activation of the relay again results in the rotation of the motor output drive shaft 36. As shaft 36 rotates cam 38 disengages movable actuator arm b of switch 46 causing contacts a and b of switch 46 to close. Eventually, cam 38 will contact movable actuator arm b of switch 45 opening contacts b and c of switch 45 and interrupting the flow of electrical energy to relay 79 allowing the automatic dynamic braking feature to again stop the motor 26. Simultaneously with the rotation of shaft 36, the bellows pump is caused to contract, forcing gas outward in hose 23 (valve 56 having been locked closed) to expel, through the hollow tip 22, the gases, solder, and any other materials previously withdrawn from the desoldered joint. The hollow tip 22 is positioned within waste receptacle 32 so as to allow the receptacle to receive the material discharged from the hollow tip. Green lamp 84 is connected to contact a of switch 45 to indicate when the bellows pump is next positioned for the bellows expansion or vacuum mode, whereas the red lamp 85 is connected to contact c of switch 46 to indicate when the bellows pump is positioned next for the bellows contraction or ejection mode. The pump has a bellows volume and stroke sufficiently large and long, respectively, to permit withdrawn solder and pollutants to be completely drawn away from the soldered joint on one stroke, and completely expelled on the next stroke, without use of operating valves.

b. Collection or Continuous Vacuum Mode

In some cases, the operator will not desire to eject the materials withdrawn from the desoldered joint into receptacle 32. Instead, due to time limitations in production work, "clean room" or controlled environment, or other requirements, the operator will want to maintain a continuous vacuum at the tip. The continuous vacuum mode may preferably employ collector type iron as in FIG. 6 to permit withdrawal of fluids and other materials from the desoldered joint directly into the collector 86. For this purpose, the normally-open switch 80 (FIG. 2) mounted to end wall 55 of frame 25, and connected in parallel with eject switch 34 (FIG. 5), is manually closed. The thumb screw 60 is loosened and pressure plate 59 is moved away from flap valve 56 so as to allow the flap valve to pivot outwardly when the bellows pump contracts. With switch 80 closed constantly, the output shaft 36 is continuously rotated by motor 26 so long as switch 49 is closed, allowing the bellows pump to be continuously expanded and contracted. During bellows expansion, a suction is present at the tip. During contraction, gas in the bellows vents immediately through the flapper so that there is little or no flow reversal in tube 23, and no reversal at the hollow tip. By opening switch 49, the motor will stop when the bellows is in the completely collapsed position.

The rubber flapper features maximum flexibility, appropriate size, durometer and thickness. Flexibility of the rubber flapper causes the flapper to be slightly indented, dimpled, or concavely flexed (dotted outline 56A in FIG. 4) when the bellows chamber is in the vacuum stroke. Thus, on alternate strokes of the bellows chamber, the rubber flapper is flexing against the edge of orifice 66. This flexing causes a very important 360° wiping action which constantly cleans the flapper and orifice seats, thereby eliminating any possibility of malfunction due to pollution build-ups.

The flexibility feature also allows air to escape during the exhaust stroke, with minimum resistance. Thus, the flexibility feature combines with the orifice size feature to eliminate need for any second check valve. Thee is no risk of exhaust pressure causing solder ejection from the soldering iron tip because it normally has entered the collector and solidifies there, and the small tip aperture and long rubber connecting tube 23 offer sufficient resistance that exhaust air escapes only through the rubber valve.

The large orifice 66 and free working flapper also permit maximum escape of any gaseous pollution which may reach the bellows chamber. Any solid waste build-ups are automatically cleaned from the smooth inner wall of the bellows chamber by wall flexing of the rubber bellows of the bellows chamber. Thus any solid waste falls harmlessly to the bottom of the bellows chamber below the level of the inlet 63. The flapper and orifice are readily accessible for eventual cleaning of the bellows chamber by simply removing screws 55C, removing cover plate 55B, tipping the unit up and dumping the foreign matter from the bellows chamber.

The combination (rubber bellows walls, rubber connecting tube, chamber volume, and dynamic braking of motor) produces a metered vacuum inhalation which terminates gradually. This eliminates sudden termination of vacuum inhalation which might otherwise cause incomplete desoldering.

Many variations in the system are contemplated and included by the present invention. For example, foot switch pedals may be utilized in lieu of the various hand switches previously described.

The invention claimed is:

1. In a system for working with materials rendered liquid by application of heat, the combination comprising:
  a heated tip having a passageway therein for passage of liquified material therethrough;
  handle means supporting said tip;
  switch means;
  pumping means coupled to said passageway and to said switch means and responsive to operation of said switch means to cause movement of fluid in said passageway in one direction, and responsive to operation of said switch means to cause movement of fluid in said passageway in the opposite direction; and, a depository;

said switch means including a first switch means and a second switch means with said second switch means mounted to said depository.

2. The combination of claim 1 wherein said depository includes:

an upwardly opening receptacle; and, actuator means for said second switch means and disposed in closely spaced relation to the opening in said receptable.

3. The combination of claim 2 wherein:

said actuator means includes a ring disposed immediately above the rim of said opening and pivotable downward to actuate said second switch means.

4. In a system for working with materials rendered liquid by application of heat, the combination comprising:

a heated tip having a passageway therein for passage of liquified material therethrough;

handle means supporting said tip;

switch means; and, pumping means coupled to said passageway and to said switch means and responsive to operation of said switch means to cause movement of fluid in said passageway in one direction, and responsive to operation of said switch means to cause movement of fluid in said passageway in the opposite direction, said pumping means including:

a chamber;

a member engaged with said chamber and movable to change the volume of said chamber;

a motor coupled to said member to drive said member to change the volume of said chamber; and, said switch means being coupled to said motor to control operation thereof.

5. The combination of claim 4 wherein:

said chamber is a bellows:

said member is a connecting rod;

a crank couples said connecting rod to said motor;

said switch means include first and second switch means;

third and fourth switch means are in circuits with said first and second switch means, respectively; and, a cam is connected to said crank and is operable upon rotation of said crank to close said third and fourth switch means alternately, to respectively enable said first and second switch means to operate said pumping means.

6. The combination of claim 5 wherein:

said cam and crank and third and fourth switch means are arranged for expanding said bellows, opening said third switch means and closing said fourth switch means during one-half revolution of said crank; and for collapsing said bellows, opening said fourth switch means and closing said third switch means during the other half revolution of said crank.

7. In a system for working with materials rendered liquid by application of heat, the combination comprising:

a heated tip having a passageway therein for passage of liquified material therethrough;

handle means supporting said tip;

switch means;

pumping means coupled to said passageway and to said switch means and responsive to operation of said switch means to cause movement of fluid in said passageway in one direction, and responsive to operation of said switch means to cause movement of fluid in said passageway in the opposite direction; and, valve means coupled to said dumping means and being operable to allow fluid escape from aid pumping means through said valve means;

said pumping means including a bellows with an end closure having a first opening communicating with said passageway and a second opening larger than said first opening; and, said valve means including a flexible flap valve mounted to said end closure adjacent said second opening and a retainer on said closure engageable with said flap valve to lockingly close said second opening.

8. The combination of claim 7 and further comprising:

a bellows support wall;

said end closure including a plate covering an open end of said bellows and securable to said wall to sealingly secure an end of said bellows to said plate;

and fastening means securing said plate to said wall and readily releasable to facilitate opening and emptying said bellows.

9. In a system for working with materials rendered liquid by application of heat, the combination comprising:

a heated tip having a passageway therein for passage of liquified material therethrough;

handle means supporting said tip;

switch means;

pumping means coupled to said passageway and to said switch means and responsive to operation of said switch means to cause movement of fluid in said passageway in one direction, and responsive to operation of said switch means to cause movement of fluid in said passageway in the opposite direction;

valve means coupled to said pumping means and being operable to allow fluid escape from said pumping means through said valve means, said valve means including:

a port having an area larger han the minimum cross sectional area for fluid movement in the coupling between said tip passageway and said pumping means;

and a one way valve member sealingly engaging a margin of said port and closing said port;

said pumping means having sufficient displacement and said valve member having sufficient flexibility to establish a convex deformation of said member in said port during establishment of a pressure drop across said member by said pumping means in a direction opposite the flow permitting direction of said valve, and to flex said member outward with respect to said margin of said port during establishment by said pumping means of a pressure drop in the flow permitting direction of said valve, thereby establishing a self cleaning wiping action of said valve member at said margin.

10. The combination of claim 9 wherein the ratio of said port area to said minimum cross sectional area is between 61 to 1 and 459 to 1.

11. A soldering-desoldering tool comprising:
a soldering device with a hollow tip;
a tube connected to said tip;
a pump having a bellows connected to said tube and having driving means connected to said bellows for expansion and collapse of said bellows, said pump being controllably operable to cyclically apply a pressure lower than ambient pressure to said tube for withdrawing materials through said hollow tip and tube; and,
exhaust valve means coupled to said bellows and having a first position operable to allow fluid escape from said bellows through said valve means.

12. The tool of claim 11 wherein:
said exhaust valve means has a second position operable to preclude fluid escape from said bellows through said valve means.

13. The tool of claim 12 wherein:
said bellows has a first opening communicating with said tube and a second larger opening communicating with said valve means;
said valve means includes a retainer and flexible flap valve mounted to said bellows pump adjacent said second opening, and wherein said retainer secures said flap valve closingly over said second opening in said second position, and said retainer is positioned away from said flap valve in said first position.

14. The combination comprising:
a heated tip having a passageway therein for passage of liquified material therethrough;
handle means supporting said tip;
switch means; and,
powered pumping means coupled to said passageway and to said switch means and responsive to operation of said switch means to cause movement of fluid in said passageway in one direction;
said pumping means including a resilient chamber device deformable for variation of volume therein to effect said movement of fluid.

15. The combination of claim 14 wherein:
said chamber device directly communicates with said heated tip passageway for reception and storage of material moved through said tip into said passageway.

16. The combination of claim 15 wherein:
said chamber device has an inlet at an elevation above the bottom thereof to permit liquid and solid material flowing to said device from said passageway to fall to said bottom and remain stored there.

17. The combination of claim 15 and further comprising:
chamber device opening means facilitating emptying of stored material deposits therefrom.

18. The combination of claim 15 wherein:
said chamber device has a smooth inner wall surface to minimize clinging of deposits thereon, and flexible to automatically clean deposits therefrom during operation of said pumping means.

19. The combination of claim 15 and further comprising:
one-way valve means coupled to said chamber device and oriented to facilitate flow of fluid from said chamber device to atmosphere, and constituting the only valve in the only flow path between an entrance to said tip passageway and atmosphere.

20. The combination of claim 14 wherein:
said switch means include first, second, third and fourth switching devices;
a motor is coupled to said chamber device to deform said device in response to operation of said motor;

said first and third switching devices are operable in combination to energize said motor;
said second and fourth switching devices are operable in combination to energize said motor independent of said first and third switching devices;
a fifth switching device is connected in parallel with said second switching device and is selectively operable to a stable closed condition to enable continuous operation of said motor under control of said first switching device independent of said second switching device;
and a cam is coupled to said motor and operable upon operation of said motor to close said third and fourth switching devices alternately to respectively enable said first and fifth switching devices to operate said pumping means.

21. The combination of claim 20 wherein:
braking means are provided on said pumping means to promptly terminate operation thereof upon deenergization of said motor.

22. The combination of claim 14 wherein:
said resilient chamber device is a bellows having a smooth elastomeric material on its inner surfaces.

23. The combination of claim 22 and further comprising:
a flexible resilient hose coupling said passageway to said resilient chamber device.

24. The combination of claim 23 and further comprising:
a collector connected between said passageway and said hose for collection of material moving from said passageway toward said resilient chamber device.

* * * * *